United States Patent [19]

Sekine et al.

[11] Patent Number: 5,114,887

[45] Date of Patent: May 19, 1992

[54] PROCESS FOR PREPARING OXYNITRIDE CERAMIC FIBERS

[75] Inventors: Masahiro Sekine; Shingo Katayama, both of Kitakyushu, Japan

[73] Assignee: Colloid Research Institute, Fukuoka, Japan

[21] Appl. No.: 687,666

[22] Filed: Apr. 19, 1991

[30] Foreign Application Priority Data

Apr. 27, 1990 [JP] Japan ................................ 2-110580

[51] Int. Cl.$^5$ ............................................. C04B 35/58
[52] U.S. Cl. ...................................... 501/95; 501/97; 501/98; 264/DIG. 19; 423/325; 423/344
[58] Field of Search ...................... 501/12, 95, 97, 98; 264/DIG. 19; 423/325, 344, 327

[56] References Cited

U.S. PATENT DOCUMENTS

| | | | |
|---|---|---|---|
| 4,761,38 | 8/1988 | Oguri et al. | 501/95 |
| 4,650,773 | 3/1987 | Okamura et al. | 501/95 X |
| 4,869,858 | 9/1989 | Funayama et al. | 501/95 X |
| 4,916,093 | 4/1990 | Okamura et al. | 501/95 |
| 5,021,370 | 6/1991 | Ishikawa et al. | 501/95 |

FOREIGN PATENT DOCUMENTS 62-263322 11/1987 Japan.
63-40742 2/1988 Japan.
63-112437 5/1988 Japan.
63-242943 10/1988 Japan.
63-310747 12/1988 Japan.

OTHER PUBLICATIONS

Chemistry Letters, pp. 2059-2060, 1984, "The Synthesis of Silicon Oxynitride Fibers by Nitridation of Polycarbosilane".

Journal of Materials Science 22 (1987) pp. 937-941, "Nitridation of $TiO_2$ Fibres Prepared by the Sol-Gel Method".

Journal of Non-Crystalline Solids 83 (1986) pp. 208-222, "Nitrogen-Containing $SiO_2$ Glass Fibers Prepared by Ammonolysis of Gels Made From Silicon Alkoxides".

*Primary Examiner*—Karl Group
*Attorney, Agent, or Firm*—Armstrong, Nikaido, Marmelstein, Kubovick & Murray

[57] ABSTRACT

The process of this invention for preparing oxynitride ceramic fibers comprises spinning a viscous sol obtained by the hydrolysis of a feed mainly consisting of metal alkoxides, steam-treating the gel fibers, and firing the steam-treated gel fibers in a stream of ammonia and is commercially useful for the production of oxynitride fibers with excellent hardness, strength, modulus of elasticity, heat resistance, and corrosion resistance.

7 Claims, No Drawings

PROCESS FOR PREPARING OXYNITRIDE CERAMIC FIBERS

FIELD OF THE INVENTION AND RELATED ART STATEMENT

This invention relates to a process for preparing oxynitride ceramic fibers and, more particularly, to a process for preparing ceramic fibers with excellent strength, modulus of elasticity, and corrosion resistance useful as reinforcements in fiber-reinforced plastics (FRP), fiber-reinforced concrete (FRC), fiber-reinforced glass, and fiber-reinforced metals or those with excellent heat and corrosion resistance useful for chemical filters and heat-resistant thermal insulation materials.

Fibrous materials are important as reinforcements for plastics and concrete and, moreover, they are consumed in a variety of high-temperature applications such as thermal insulating curtains, thermal insulating cushions, catalyst carriers, and high-temperature filters.

Glass fibers, carbon fibers, alumina fibers, silicon carbide fibers, and organic polymer fibers have found use in the above-mentioned applications up to the present. In recent years, however, the property requirements for this type of fibers have diversified and development of fibers with new functions is awaited.

Oxynitride ceramic fibers are one of such new fibers. When oxynitride ceramics are amorphous, that is, when they are oxynitride glasses, they show enhanced hardness, strength, modulus of elasticity, heat resistance, and corrosion resistance compared with those of corresponding oxide glasses. On the other hand, when oxynitride ceramics are polycrystalline, for example, when they are Sialon, they show marked improvement in high-temperature strength, hardness, and thermal shock resistance compared with those of oxide ceramics. Roughly classified, two processes have been studied for the preparation of oxynitride ceramics or a blend of oxide and nitride ceramics in fibers.

I. Spinning of a Melt of Oxides and Nitrides [Japan Tokkyo Kokai Koho 63-310,747 (1988)]

This process poses the following problems. The melting of oxides and nitrides requires high temperature. An undesirable crystal phase or metal phase forms as a result of the decomposition of nitrides or the reduction of oxides. Moreover, a special spinning apparatus is needed for stable preparation of oxynitride glass.

II. Preparation of Precursor Fibers From Metal Alkoxides and Inorganic Polymers Followed by Nitridation-Sintering (1) A process for the spinning of polycarbosilanes and the subsequent nitridation is disclosed in Chemistry Letters 2059–2060 (1984). This process has problems such as the complexity of the polycarbosilane synthesis and the limitation on the oxynitride glass composition.

(2) According to the processes disclosed in Journal of Materials Science 22, 937–941 (1987) and Japan Tokkyo Kokai Koho Nos. 62-263,322 (1987) and 63-40, 742 (1988), $TiO_2$ gel fibers or Ti-containing gel fibers are nitridated to yield TiN fibers, TiN-coated $TiO_2$ fibers, or Ti-containing infrared-transparent oxynitride glass. The composition of the ceramics produced by these processes, however, is limited to a system containing Ti which exhibits an extremely high reactivity with nitrogen.

(3) Processes based on the nitridation of Si-containing gel fibers are disclosed in Journal of Non-Crystalline Solids 83, 208–222 (1986) and Japan Tokkyo Kokai Koho Nos. 63-112,437 (1988) and 63-242,943 (1988). With these processes, however, practically no nitrogen enters the gels fibers prepared from tetrafunctional alkoxides such as tetraethoxysilane alone when submitted to the nitridation in a stream of ammonia and this has necessitated straight or mixed use of alkyltrialkoxysilanes such as methyltriethoxysilane. A small amount of nitrogen, 6% by weight or so, can enter the fibers with the use of methyltriethoxysilane, but carbon remains in the product ceramic fibers and the introduction of nitrogen cannot be increased any further.

OBJECT AND SUMMARY OF THE INVENTION

The present inventors have undertaken extensive studies to overcome the problems in the conventional processes, and have found that, in the preparation of oxynitride ceramic fibers by sintering the gel fibers obtained from metal alkoxides in a stream of ammonia, the above-mentioned problems could be solved by treating the gel fibers with steam prior to the sintering in a stream of ammonia, and the completed this invention.

It is therefore an object of this invention to provide a process for preparing oxynitride ceramic fibers which does not require a high-temperature process or a complicated and costly apparatus and is easy to practice.

Another object of this invention is to provide a process for preparing oxynitride ceramic fibers which does not require the synthesis of complex precursors such as polycarbosilanes.

Still another object of this invention is to provide a process for preparing oxynitride ceramic fibers which imposes no limitation on the composition of ceramics to be produced.

This invention accordingly relates to a process for preparing oxynitride ceramic fibers which comprises spinning a viscous sol obtained by hydrolysis of metal alkoxides, the principal raw materials, to form gel fibers and treating said gel fibers with steam and then sintering in a stream of ammonia.

The metal alkoxides to be used in this invention are represented by the following general formula

$M(OR)_n$ in which M is a metal or metalloid element, R is an alkyl group, and n is the valence of the metal or metalloid element. Examples of the alkyl group R are methyl, ethyl, n-propyl, isopropyl, n-butyl, sec-butyl, and tert-butyl. Examples of metals and metalloids include Si, Al, Zr, Ti, B, Ge, Be, Mg, and Y. The metalloids here refer to those elements which are present in an area near the border between metal elements and nonmetal elements in the periodic table and are exemplified by B, Si, Ge, and As.

The raw materials mainly consisting of silicon alkoxides and/or aluminum alkoxides, among the aforesaid metal alkoxides, yield oxynitride ceramics with excellent properties, heat resistance, and corrosion resistance such as oxynitride glass and Sialon and it is desirable to use raw materials containing at least one of these two alkoxides. In particular, with the use of a silicon alkoxide or aluminum alkoxide or with the combined use of only the two, the porous gel fibers obtained by the steam treatment to be described later do not form dense structure before the nitridation temperature range, which is favorable for the introduction of high content of nitrogen into ceramic fibers. From the same point of view, it is particularly desirable to use a silicon alkoxide singly or to use a mixture of a silicon alkoxide and an aluminum alkoxide having a mole ratio of Al to the metals, or Al/(Al+ Si), of 0.75 or more.

A silicon alkoxide may be submitted to preliminary polycondensation and the resulting oligomers may be used as raw material. Also, when a silicon alkoxide is used, it is allowable to use, in addition to metal alkoxides of the aforesaid general formula, alkylalkoxysilanes or phenylalkoxysilanes represented by the following general formula $$R_{(4-n)}Si(OR')_n$$

in which R is an alkyl group having 1 to 4 carbon atoms or phenyl, R' is an alkyl group having 1 to 4 carbon atoms, and n is an integer from 1 to 3, preferably 2 or 3. The use of such alkoxides is extremely useful for the preparation of multicomponent ceramic fibers such as aluminosilicates where fibers become dense at a lower temperature and the alkylalkoxysilanes in question help to introduce nitrogen into the fibers before this desification temperature.

The hydrolysis of the aforesaid metal alkoxides yields a spinnable sol and this reaction should preferably be carried out in the presence of an organic solvent to assure miscibility of the metal alkoxides and unformity of the reaction. The organic solvents to be used here are desirably good solvents of the metal alkoxides and include alcohols such as methanol, ethanol, propanol, isopropanol, and sec-butanol, aromatic hydrocarbons such as toluene, benzene, and xylene, tetrahydrofuran, dimethylformamide, and carbon tetrachloride, the alcohols being preferable from the standpoint of solubility.

The metal alkoxides are hydrolyzed into a spinnable sol by any one of the known procedures for hydrolysis. For example, metal alkoxides mainly consisting of silicon alkoxides are hydrolyzed by addition of 1 to 2 moles of water per 1 mole of the metal alkoxides in the presence of a strongly acidic catalyst such as hydrochloric acid and nitric acid. On the other hand, metal alkoxides mainly consisting of aluminum alkoxides which are highly reactive to water are allowed to react with a suitable amount of a $\beta$-diketone such as acetylacetone and ethyl acetoacetate or an alkanolamine such as ethanolamine and triethanolamine in advance and then the resulting reaction products are hydrolyzed with water added in an amount of 1 to 2 moles per 1 mole of the metal alkoxides.

It is possible to add species of metal compounds other than alkoxides to the aforesaid metal alkoxides and use the mixtures as starting materials. Such other species of compounds include metals, acetates, chlorides, and nitrates; they may be hydrolyzable or not and they should desirably remain as little as possible as non-ceramic components after sintering.

The spinnable sol resulting from the hydrolysis of the metal alkoxides can be spun by a known procedure. For example, it can readily be spun into gel fibers by extrusion through a nozzle.

The diameter of such gel fibers is not specified, but it is normally from 2 to 50 $\mu$m.

In the process of this invention, the gel fibers thus prepared are treated with steam and then nitridated by sintering in a stream of ammonia.

The treatment with steam here means a treatment in a humidified atmosphere at a temperature of 40° C. or more and a relative humidity of 50% or more, namely in the temperature range from 40° C. upward and at an absolute humidity of 0.024 kg of $H_2O$/kg of dry air or more. In order to shorten the treating time, it is preferable to carry out the treatment in question at a temperature of 60° C. or more and a relative humidity of 60% or more, namely in the temperature range from 60° C. upward and at an absolute humidity of 0.091 kg of $H_2O$/kg of dry air or more. It is sufficient to carry out the steam treatment in an atmosphere of high humidity and at atmospheric pressure, although high-pressure steam of 100° C. is naturally applicable.

The treatment time cannot be decided unambiguously as it is affected by the kind and composition of the metal alkoxides used and also by the temperature and humidity. The higher the temperature and the higher the humidity, the shorter the treatment time becomes. A period of five minutes or more is normally effective. A too short steam treatment introduces less nitrogen than necessary into the fibers after nitridation-sintering, lowering the efficiency excessively and causing the problem of residual carbon. A too long treatment causes no specific problem, but the treatment time should desirably be chosen at an optimal level from the overall process consideration.

The steam treatment of gel fibers can be carried out continuously or batch-wise.

The gel fibers thus treated with steam are then nitridated in a stream of ammonia to yield oxynitride ceramic fibers. The nitridation here is carried out at 400° C. or above, preferably at 500° C. or above, depending upon the composition of the gel fibers and the ammonia may be diluted with an inert gas such as nitrogen, helium, and argon.

In order to eliminate the micropores remaining after the nitridation-sintering in ammonia, the gel fibers may be sintered in a gas with a high diffusion rate, for example, hydrogen and helium, as is normally done in the sintering of ceramics.

The nitridation of oxide gel fibers is considered to be a reaction between solid and vapor phases and this reaction occurs with difficulty if the micropores in the gel fibers close up to form dense fibers before they reach the nitridation temperature. The steam treatment conducted according to the process of this invention produces gel fibers with a well-developed inorganic skeleton and a relatively large specific surface area, which is beneficial for the progress of nitridation. Moreover, it is likely that the temperature for densifying the fibers itself rises as nitrogen is introduced and this in turn facilitates the introduction of nitrogen.

The above-mentioned beneficial effect is maintained even when readily nitridable compounds such as alkylalkoxysilanes are used as part of the raw materials and more nitrogen is introduced here than without the steam treatment.

The process of this invention is extremely useful industrially as it can easily produce oxynitride ceramic fibers of excellent hardness, strength, modulus of elasticity, heat resistance, and corrosion resistance without special equipment.

DETAILED DESCRIPTION OF THE PREFERRED EMBODIMENTS

This invention will be explained in detail with reference to the accompanying examples and comparative examples. It is to be understood that this invention is not limited to the examples herein described.

EXAMPLE 1

Tetraethoxysilane, water, hydrochloric acid, and ethanol were mixed at mole ratio 1:1.5:0.01:2.5 and left without cover in a thermostat at 50° C. to yield a spinnable sol with a viscosity of 350 poises, which was spun by extrusion into continuous gel fibers.

The gel fibers were treated with steam under the conditions of 70° C. and 85% relative humidity for 5 days and then submitted to nitridation-sintering. The steam-treated gel fibers showed a large specific surface area of 274 $m^2/g$. The nitridation was carried out at 1200° C. in a stream of ammonia at a flow rate of 0.5 l./min. for 3 hours. The resulting fibers were colorless and transparent and found amorphous by X-ray diffraction analysis. The nitrogen content was high at 16% by weight.

COMPARATIVE EXAMPLE 1

The gel fibers as spun in Example 1 were dried at 100° C. for 24 hours and submitted to nitridation-sintering. The dried fibers were dense with a specific surface area of 1.4 $m^2/g$. The fibers were then nitridated and sintered under the same conditions as in Example 1 to yield fibers which were partly black with residual carbon and found amorphous by X-ray diffraction analysis. The nitrogen content was extremely low at 1.0% by weight.

COMPARATIVE EXAMPLE 2

The gel fibers as spun in Comparative Example 1 were directly nitridated and sintered under the same conditions as in Example 1 without the steam treatment or drying. The sintered fibers were comparable in properties to those in Comparative Example 1 with a low nitrogen content of 1.1% by weight.

EXAMPLE 2

The steam-treated gel fibers in Example 1 were nitridated at 1400° C. in a stream of ammonia at a flow rate of 0.5 l./min. for 3 hours. The resulting fibers were colorless and transparent and found amorphous by X-ray diffraction analysis. The nitrogen content was high at 24.3% by weight.

COMPARATIVE EXAMPLE 3

The dried gel fibers obtained in Example 1 were nitridated and sintered under the conditions of Example 2. The sintered fibers were fused together, lost the fibrous shape, and were tinged black with residual carbon. The fibers were found amorphous by X-ray diffraction analysis and showed an extremely low nitrogen content at 1.2% by weight.

EXAMPLE 3

A solution of 0.8 mole of aluminum tri(2-butoxide) in 2 moles of butanol was mixed uniformly with 0.25 mole of ethyl acetoacetate and allowed to react. To this solution was added a solution prepared by hydrolyzing 0.4 mole of methyltriethoxysilane with 0.4 mole of water acidified to 1N by hydrochloric acid and the mixture was allowed to react and then hydrolyzed by addition of 0.8 mole of water. Part of the solvent in the reaction mixture was evaporated at 50° C. under reduced pressure to yield a spinnable sol with a viscosity of 430 poises, which was spun by extrusion into continuous gel fibers.

The gel fibers were treated with steam under the conditions of 70° C. and 85% relative humidity for 24 hours and submitted to nitridation-sintering. The steam-treated fibers showed a specific surface area of 276 $m^2/g$. The nitridation was carried out at 600° C. in a stream of ammonia at a flow rate of 0.5 l./min. for 4 hours. The fibers, colorless and transparent, were found amorphous by X-ray diffraction analysis and contained 3.62% by weight of nitrogen.

COMPARATIVE EXAMPLE 4

The gel fibers obtained in Example 3 were dried at 100° C. for 24 hours and then nitridated and sintered under the same conditions as in Example 3. The fibers were black with residual carbon and low in nitrogen content at 1.2% by weight.

EXAMPLE 4

A solution of 0.8 mole of aluminum tri(2-butoxide) in 2 moles of butanol was mixed uniformly with 0.32 mole of ethyl acetoacetate and allowed to react. To this solution was added a solution prepared by hydrolyzing 0.4 mole of tetraethoxysilane with 0.4 mole of water acidified to 1N with hydrochloric acid and the mixture was allowed to react and then hydrolyzed by addition of 0.8 mole of water. Part of the solvent in the reaction mixture was evaporated at 50° C. under reduced pressure to yield a spinnable sol with a viscosity of 520 poises, which was spun by extrusion into continuous gel fibers.

The gel fibers were treated with steam under the conditions of 70° C. and 85% relative humidity for 24 hours and submitted to nitridation-sintering. The steam-treated fibers showed a specific surface area of 245 $m^2/g$. The nitridation was carried out at 1200° C. in a stream of ammonia at a flow rate of 0.5 l./min. for 4 hours. The resulting fibers were colorless and transparent and contained 3.22% by weight of nitrogen.

COMPARATIVE EXAMPLE 5

The fibers obtained in Example 4 were dried at 100° C. for 24 hours and nitridated and sintered under the same conditions as in Example 4. The fibers were black with residual carbon and contained 0.60% by weight of nitrogen.

EXAMPLE 5

Boron-containing silica gel fibers were prepared in the following manner while using $H_3BO_3$ as the source of boron.

A solution of 0.1 mole of $H_3BO_3$ in 1 mole of ethanol was added to a solution of 0.9 mole of tetraethoxysilane in 1 mole of ethanol and mixed uniformly. The resulting solution was hydrolyzed by 1.3 moles of water acidified to 1N with hydrochloric acid at 50° C. for 3 hours. Part of the solvent in the reaction mixture was evaporated at 50° C. under reduced pressure to yield a spinnable sol with a viscosity of 380 poises, which was spun by extrusion into continuous gel fibers.

The gel fibers were treated with steam under the conditions of 70° C. and 85% relative humidity for 3 days and sumbitted to nitridation-sintering. The steam-treated fibers showed a specific surface area of 245 $m^2/g$. The nitridation was carried out at 800° C. in a stream of ammonia at a flow rate of 0.5 l./min. for 4 hours. The resulting fibers were colorless and transparent and contained 2.53% by weight of nitrogen.

COMPARATIVE EXAMPLE 6

The gel fibers obtained in Example 5 were directly nitridated and sintered under the same conditions as in Example 5. The resulting fibers were brown and contained 0.17% by weight of nitrogen.

EXAMPLE 6

A solution of 0.85 mole of aluminum tri(2-butoxide) in 2 moles of butanol was mixed uniformly with 0.34 mole of ethyl acetoacetate and allowed to react. To this solution was added a solution prepared by hydrolyzing 0.15 mole of tetraethoxysilane with 0.15 mole of water acidified to 1N with hydrochloric acid and the mixture was allowed to react and then hydrolyzed with 0.8 mole of water. Part of the solvent in the reaction mixture was evaporated at 50° C. under reduced pressure to yield a spinnable sol with a viscosity of 650 poises, which was spun by extrusion into continuous gel fibers.

The gel fibers were treated with steam under the conditions of 70° C. and 85% relative humidity for 48 hours and submitted to nitridation-sintering. The steam-treated fibers showed a specific surface area of 220 $m^2/g$. The nitridation was carried out at 1400° C. in a stream of ammonia at a flow rate of 0.5 l./min. for 3 hours. The resulting fibers were white and contained 20.5% by weight of nitrogen. The fibers were confirmed by X-ray diffraction analysis to have crystalline phases of $\beta$-Sialon and AlN.

COMPARATIVE EXAMPLE 7

The gel fibers obtained in Example 6 were dried at 100° C. for 24 hours and nitridated and sintered under the same conditions as in Example 6. The resulting fibers contained 0.9% by weight of nitrogen and mullite was found in their crystalline phase.

What is claimed is:

1. A process for preparing oxynitride ceramic fibers comprising spinning a viscous sol obtained by hydrolysis of a feed mainly consisting of metal alkoxides to produce gel fibers, treating the resulting gel fibers with steam, and firing the steam-treated fibers in a stream of ammonia.

2. A process for preparing oxynitride ceramic fibers according to claim 1 wherein the steam treatment of said gel fibers is carried out in an atmosphere kept at a temperature of 40° C. or more and a relative humidity of 50% or more.

3. A process for preparing oxynitride ceramic fibers according to claim 1 wherein said metal alkoxides consist mainly of silicon alkoxides and/or aluminum alkoxides.

4. A process for preparing oxynitride ceramic fibers according to claim 3 wherein said metal alkoxides are silicon alkoxides.

5. A process for preparing oxynitride ceramic fibers according to claim 3 wherein said metal alkoxides are bicomponent alkoxides containing silicon alkoxides and aluminum alkoxides with the mole ratio of Al to (Al+Si) controlled at 0.75 or more.

6. A process for preparing oxynitride ceramic fibers according to claim 3 wherein, prior to hydrolysis, aluminum alkoxides are allowed to react with at least one $\beta$-diketone, $\beta$-ketoester, and alkanolamine to produce reaction products and the reaction products are then hydrolyzed.

7. A process for preparing oxynitride ceramic fibers according to claim 5 wherein, prior to hydrolysis, aluminum alkoxides are allowed to react with at least one $\beta$-diketone, $\beta$-ketoester, and alkanolamine to produce reaction products and the reaction products are then hydrolyzed.

* * * * *